United States Patent [19]

Weinert et al.

[11] Patent Number: 5,770,303
[45] Date of Patent: Jun. 23, 1998

[54] OCCLUDED COMPOSITE-PARTICLE LATEX

[75] Inventors: Raymond J. Weinert, Macedonia; Satish C. Sharma, Stow; John P. Kovalchin; David M. Lee, both of Akron; Nick G. Triantafillopoulos, Stow; Ira John Westerman, Wadsworth, all of Ohio

[73] Assignee: GenCorp Inc., Fairlawn, Ohio

[21] Appl. No.: 583,260

[22] Filed: Jan. 5, 1996

Related U.S. Application Data

[63] Continuation-in-part of Ser. No. 271,402, Jul. 6, 1994, abandoned.

[51] Int. Cl.$^6$ ............................................... B32B 5/16
[52] U.S. Cl. ........................... 428/326; 428/327; 428/500; 428/507; 428/509; 428/510; 428/511; 428/512; 428/513; 428/514; 523/201; 524/458
[58] Field of Search ........................... 524/458; 523/201; 428/507, 509, 500, 511, 510, 326, 512, 513, 514, 327

[56] References Cited

U.S. PATENT DOCUMENTS

| | | | |
|---|---|---|---|
| 4,134,872 | 1/1979 | Lee | 427/391 X |
| 4,325,856 | 4/1982 | Ishikawa et al. | 523/201 |
| 4,569,964 | 2/1986 | Lee et al. | 524/460 |
| 4,613,633 | 9/1986 | Sekiya et al. | 523/201 |
| 4,616,057 | 10/1986 | Lindemann et al. | 524/458 |
| 4,751,111 | 6/1988 | Lee et al. | 427/361 |
| 5,177,128 | 1/1993 | Lindemann et al. | 524/44 |
| 5,356,956 | 10/1994 | Uemae et al. | 523/201 |

*Primary Examiner*—Judy M. Reddick
*Attorney, Agent, or Firm*—Robert F. Rywalski; Daniel J. Hudak

[57] ABSTRACT

A latex binder composition comprises occluded composite particles containing at least a vinyl ester homopolymer or a copolymer thereof polymerized from acrylate and/or ethylene monomers, and a polymer polymerized from conjugated diene and/or vinyl substituted aromatic monomers and desirably unsaturated carboxylic acid monomers. The occluded composite particles are produced in the absence of crosslinking agents by first polymerizing the vinyl esters and optional acrylate and/or ethylene monomers, and subsequently in situ polymerizing the conjugated diene and/or vinyl substituted aromatic, etc., monomers in the presence of the vinyl ester latex particles. The occluded composite-particle latex contains phase separated domains which are neither a core-shell nor an inverted core-shell particle and provide properties which are superior to physical blends of the two classes of polymers when utilized as binders in paper coating formulations. Such properties include excellent ink receptivity, low mottle, good blister resistance, good coating strength, good brightness, and the like.

13 Claims, 2 Drawing Sheets

OCCLUDED COMPOSITE-PARTICLE LATEX

CROSS-REFERENCE

This application is a Continuation-In-Part of U.S. Ser. No. 08/271,402, filed Jul. 6, 1994, now abandoned, for "Composite-Particle Latex."

FIELD OF INVENTION

The present invention relates to a composite latex. A first latex polymer is formed from the free radical emulsion polymerization of vinyl ester monomers such as vinyl acetate with optional acrylate and/or ethylene monomers. At least a second latex polymer is formed from various vinyl substituted aromatics and/or conjugated dienes, and desirably unsaturated carboxylic acids to form phase-separated occluded composite particles having separate and distinct (co)polymers therein. The occluded composite particles are not of a core-shell or of an inverted core-shell configuration. These composite latexes exhibit a superior balance of properties as binders for paperboard and paper coating applications as compared to physical blends of vinyl ester latexes and styrene-butadiene latexes.

BACKGROUND

Heretofore, latex compositions which when used in coatings for paperboard or paper have either improved properties such as 1) brightness, brightness stability, ink receptivity and blister resistance or 2) coating strength and paper gloss, but not both.

U.S. Pat. Nos. 4,616,057 and 5,177,128 to Lindemann relate to interpenetrating polymer networks wherein a first polymer emulsion is made from various monomers such as vinyl esters, acrylates, vinyl substituted aromatics, and the like, along with an active cross-linking agent. This cross-linking agent is defined as a functional monomer which results in the formation of a cross-linked polymer during the polymerization of the first polymer. After the formation of the first crosslinked polymer, a second monomer is introduced into the reactor and allowed to equilibrate. Equilibration is defined as allowing sufficient time for the second monomer to become absorbed into the first polymer, that is, to become thoroughly mixed and dispersed throughout the first polymer emulsion on a molecular scale. The second monomer is then polymerized and can also be crosslinked. It is a necessary aspect of both of these patents that at least the first polymer be crosslinked and that the second monomer be equilibrated therein before its polymerization is initiated.

U.S. Pat. No. 4,325,856, to Ishikawa and Lee relates to core-shell latex particles having a predominately hydrophobic core portion and a relatively hydrophilic shell portion.

SUMMARY OF THE INVENTION

The composition of the present invention is an occluded composite-particle latex which does not use crosslinking agents during at least formation of the first polymer. The individual latex particles are an occluded composite of at least two different types of polymers. Initially, particles are produced via emulsion polymerization in which vinyl esters having an ester portion containing from 2 to 10 carbon atoms are polymerized with optional ethylene and/or (meth) acrylate monomers having an ester portion containing from 2 to about 10 carbon atoms. The amount of the ethylene and/or (meth)acrylate monomers can be up to about 70 percent by weight. After formation of the first or prior homo or copolymer, one or more polymer forming monomers are added to the emulsion polymer latex and in situ polymerized to form a second polymer in the same particle. Subsequently added monomers include various vinyl substituted aromatics having from about 8 to about 12 carbon atoms and/or various conjugated dienes having from 4 to 10 carbon atoms and desirably unsaturated carboxylic acids having a total of from 3 to 12 carbon atoms. Still later, additional polymers can be formed as by using specific monomers desirably different than before, e.g., different conjugated dienes and/or vinyl substituted aromatics, and the like. The occluded composite particles accordingly contain at least two distinct polymers therein, typically in phase separated domains. However, the occluded composite particles are not a core-shell polymer nor a reverse encapsulated core-shell particle of the type described by U.S. Pat. No. 4,325,856. The composite-particle latex is essentially free of coagulum and exhibits unexpected properties when utilized as a binder for paper board and paper coatings.

IN THE DRAWINGS

FIG. 1 is an electron micrograph showing occluded composite particles containing about 75 percent by weight of a vinyl acetate polymer and about 25 percent by weight of a carboxylated styrene-butadiene copolymer (Example 10), and FIG. 2 is an electron micrograph showing occluded composite particles containing about 30 percent by weight of a vinyl acetate polymer and about 70 percent by weight of a carboxylated styrene-butadiene copolymer (Example 8).

DETAILED DESCRIPTION OF THE INVENTION

Figure 1:
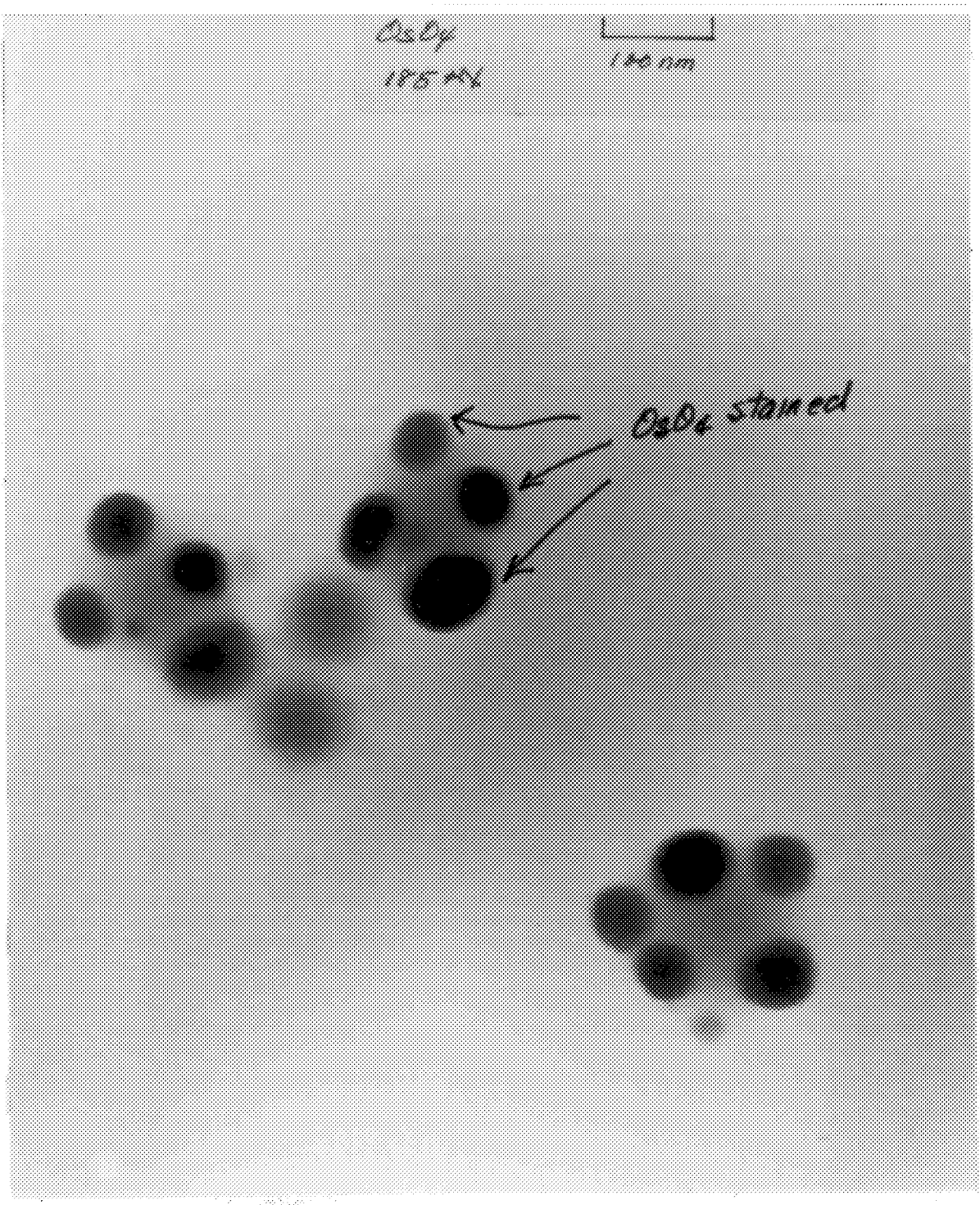

The occluded latex compositions of the invention are formed by conventional emulsion polymerization techniques. The composite latex particles are dispersed in an aqueous medium and generally have at least two (preferred), three, or more distinct (co)polymers in a single particle. The initial, first or prior latex vinyl 2-ethylhexanoate-emulsion is made from one or more vinyl ester monomers having a total of from 4 to 12 carbon atoms and desirably from 4 to 6 carbon atoms. Examples of suitable vinyl esters include vinyl pivalate, vinyl propionate, vinyl 2-ethylhexanoate, vinyl esters of versatic acid (VeOVa), and the like, with vinyl acetate being highly preferred. Optional but often desirable comonomers include ethylene and/or one or more alkyl (meth)acrylates wherein the alkyl portion has a total of from 1 to 10 carbon atoms and desirably from 2 to 8 carbon atoms. Examples of suitable alkyl (meth)acrylate esters include ethyl acrylate, butyl acrylate, isobutyl acrylate, hexyl acrylate, octyl acrylate, 2-ethylhexyl acrylate, methyl methacrylate, ethyl methacrylate, and the like, with 2-ethylhexyl acrylate, or ethyl acrylate, or n-butyl acrylate, or combinations thereof being preferred. Generally, the greater the number of carbon atoms in the ester portion, the lower the Tg of the resulting vinyl ester-acrylate copolymer. It is to be understood that when the optional acrylate monomers are utilized, the resulting polymer may be a copolymer or a mixture of a copolymer and a vinyl ester homopolymer.

The amount of the ethylene and/or one or more acrylates is generally up to about 70 parts by weight, desirably from about 0 to about 50 parts by weight, and preferably from about 1 to about 30 parts by weight based upon 100 total parts by weight of all of the (meth)acrylate, ethylene, and vinyl ester monomers. Generally, low amounts of acrylate monomers are preferred because of their higher cost relative to that of vinyl esters.

The first stage polymer of the present invention is substantially free of hydrophilic repeat groups, other than those derived from the above-noted vinyl hydrophilic esters, e.g., vinyl acetate, since otherwise the latex has poor stability. Formation of unsuitable amounts of coagulum and agglomerates is thus avoided. The term "substantially free of," means that less than 2.0 percent, desirably less than 1.0 percent, and preferably less than 0.5 percent or none at all, of hydrophilic monomers exist, other than said vinyl esters, based upon the total weight of the hydrophilic monomers and the vinyl ester monomers as well as the optional ethylene and/or alkyl (meth)acrylate monomers. Hydrophilic monomers are defined as monomers which have a solubility in water of at least about 3 weight percent at 25° C. Hydrophilic monomers to be avoided include monoethylenically unsaturated carboxylic acid, especially a monobasic, monoethylenically unsaturated carboxylic acid containing from 3 to about 10 carbon atoms such as, for example, acrylic acid, methacrylic acid, crotonic acid, haloacrylic acids (e.g., 2-chloroacrylic acid, 2-bromoacrylic acid, 3-chloroacrylic acid, 2,3-dichloroacrylic acid, 3,3-dichloroacrylic acid, etc.), 2-phenylacrylic acid, 3-phenylacrylic acid, vinyl benzoic acid, isopropenyl benzoic acid, and the like. Also avoided are hydrophilic (e.g., amide-, aldehyde-, glycidyl-, hydroxyl alkyl-, etc., containing) derivatives of such monoethylenically unsaturated carboxylic acids. Examples of such hydrophilic derivatives include acrylamide, methacrylamide, acrolein, methacrolein, glycidyl acrylate and methacrylate, hydroxyethyl acrylate, and the like. Similarly, other hydrophilic compounds which are avoided include monoethylenically unsaturated dicarboxylic acids such as, for example, fumaric, itaconic, maleic, etc.

The utilization of such acids or hydroxy alkyl acrylate water-soluble monomers such as 2-hydroxy ethyl acrylate, acrylic acid, and 3-sulfopropylmethacrylate has been found unsuccessful to stabilize the first stage polymers, and hence an occluded composite-particle latex could not be made.

It is also an important aspect of the present invention that the initial emulsion polymer is a thermoplastic and, therefore, substantially if not completely free of chemical crosslinks. By the term "substantially free," it is meant that at least 90 percent, desirably at least 95 percent, and preferably at least 97, 98, or 99 percent, and even 100 percent by weight of the first stage polymer is soluble in a vinyl ester polymer solvent such as tetrahydrofuran at 20° C.

The emulsion polymerization can be batch, semi-batch, semi-continuous, or continuous, with semi-continuous generally being desired. Alternatively, vinyl acetate can be added initially and ethylene and/or (meth)acrylate can be metered in continuously. Free radical initiators are generally utilized and examples of such include sodium persulfate, ammonium persulfate, potassium persulfate, and the like. Other free radical initiators can be utilized which decompose or become active at the temperature utilized during polymerization such as various peroxides, e.g., cumene hydroperoxide, dibenzoyl peroxide, diacetyl peroxide, dodecanoyl peroxide, di-t-butyl peroxide, dilauroyl peroxide, bis(p-methoxy benzoyl) peroxide, t-butyl peroxy pivalate, dicumyl peroxide, isopropyl percarbonate, and di-sec-butyl peroxy dicarbonate; redox initiators such as peroxide-ferrous iron, persulfate-bisulfite, and hydroperoxide-polyamine systems; various azo initiators such as azobisdimethylvaleronitrile, 2,2'-azobisisobutyronitrile, 2,2'-azobis(2-amidinopropane)dihydrochloride, 2,2'-azobis-2-methyl-butyronitrile, 2,2'-azobis(methylisobutyrate), and the like; and mixtures thereof. The amount of the free radical initiator is generally from about 0.01 to about 2.0, and preferably from about 0.3 to about 1.5 parts by weight per 100 parts by weight of said vinyl ester and any acrylate and/or ethylene monomers.

Optional chain transfer agents include halocarbons such as carbon tetrachloride and mercaptans such as the alkyl and/or aralkyl mercaptans having from 8 to about 18 carbon atoms and preferably from about 12 to about 14 carbon atoms. The tertiary alkyl mercaptans having from 12 to 14 carbon atoms are highly preferred. Examples of suitable mercaptans include n-octyl mercaptan, n-dodecyl mercaptan, t-octyl mercaptan, t-dodecyl mercaptan, tridecyl mercaptan, tetradecyl mercaptan, hexadecyl mercaptan, and the like, as well as mixtures thereof. The amount of the chain transfer agent when utilized, is generally from about 0.01 to about 5 parts by weight per 100 parts by weight of the vinyl ester and any acrylate and/or ethylene monomers.

The emulsifiers which are utilized are conventional such as nonionic or preferably anionic and generally include various alkyl sulfates, various alkyl aryl sulfonates, various alpha olefin sulfonates, partially sodium neutralized organic esters and organic phosphate esters, various fatty or rosin acid salts, nonyl or octyl phenol reaction products of ethylene oxide and the like. The alkyl portion of the various emulsifiers generally has from 8 to 18 carbon atoms. Examples of suitable anionic surfactants include sodium lauryl sulfate, sodium dodecylbenzene sulfonate, various sulfosuccinates such as sodium dimethylamyl sulfosuccinate, e.g., Aerosol MA80, sodium dodecyl diphenyl oxide disulfonate, e.g., Dowfax 2A1, and various fatty alcohol sulfates. Regardless of the specific type of surfactant utilized, the amounts thereof are generally conventional such as from about 0.5 to about 10 and desirably from about 1 to about 7 parts by weight per 100 parts by weight of the vinyl ester and any acrylate and/or ethylene monomers.

Polymerization temperatures are generally conventional such as from about 5° C. to about 95° C., and desirably from about 40° C. to about 85° C. The amount of solids, that is, the (co)polymer, is generally from about 10 to about 50, and preferably from about 15 to about 40 percent by weight based upon the total weight of the polymer and the remaining ingredients, for example, water.

It is an important aspect of the present invention that the initial or prior emulsion polymerization is conducted using the above-noted one or more vinyl esters and optionally the one or more (meth)acrylate or ethylene monomers. Otherwise, if the initial emulsion polymerization is of the vinyl substituted aromatic, conjugated diene, etc. type monomers, generally no polymerization of vinyl esters occurs when the vinyl ester and optional acrylate or ethylene monomers are subsequently added and polymerized.

In a subsequent or second stage polymerization, various one or more monomers and additives are added to the vinyl ester-containing latex and are polymerized in situ to form the composite particle containing a second (co)polymer therein. It is to be understood that in the subsequent or second stage, only one type of monomer need be added, e.g., a conjugated diene or a vinyl substituted aromatic, or that one or more monomers of said conjugated diene as well as said vinyl substituted aromatic can be added. Alternatively, still additional or later stage polymerizations, e.g., sequentially, can be conducted utilizing similar if not the same types of monomers previously polymerized or desirably one or more different conjugated diene monomers and/or vinyl substituted aromatic monomers. Accordingly, a vast number of permutations exist with regard to the exact type of composite particle formed by the present invention. Preferably, both a conjugated diene and a vinyl substituted aromatic are used in the second stage. The type of addition is generally incremental but can also be batch, semi-continuous, and the like. When a semi-continuous addition is utilized containing two or more monomers, the ratio of the monomers with respect to one another can be changed.

The one or more conjugated dienes can contain from 4 to 12 carbon atoms and desirably from 4 to 8 carbon atoms with specific examples including piperylene, isoprene, 2,3-dimethyl-1,3-butadiene, hexadiene, and the like, with butadiene being preferred. Suitable one or more vinyl substituted aromatic monomers generally contain from 8 to 12 carbon, atoms with specific examples including alpha-methyl styrene, p-tertiary butyl styrene, p-vinyl toluene, 3-methyl styrene, p-vinyl phenol, and the like, with styrene being preferred.

The amount of the conjugated dienes when utilized with vinyl substituted aromatics to form the subsequent emulsion polymer will vary depending upon the desired end use of the composite-particle latex with higher amounts of monomer being utilized for better adhesion properties and lower amounts being utilized for paper coating applications. Generally, the amount of the conjugated dienes can range from about 10 parts to about 70 parts and desirably from about 25 parts to about 60 parts by weight based upon 100 total parts by weight of all the conjugated dienes and the vinyl substituted aromatic monomers. Naturally, the amount of the one or more vinyl substituted aromatic monomers is the difference and hence it is from about 90 to about 30 parts and desirably from about 75 to about 40 parts based upon 100 total parts by weight of all of the conjugated diene and vinyl substituted aromatic monomers.

In order to provide latex stability, that is, to prevent coagulation or agglomeration of the particles, it is desirable to use unsaturated carboxylic acids having from 3 to 12 carbon atoms in the second stage (i.e., second polymer) in an amount of from about 0.1 or 0.3 or 0.5 to about 2.5 or 5 or 10 parts by weight and desirably from about 0.3 or 0.5 to about 1.75 or 2.0 or 3.0 parts by weight based upon 100 parts by weight of all of said vinyl substituted aromatic and/or conjugated diene monomers. Examples of such acids include acrylic acid, maleic acid, fumaric acid, itaconic acid, methacrylic acid, and hexanoic acid, and the like with itaconic acid being highly preferred. The use of such acids in the second stage is very important to achieve a high latex solids content of at least 45 percent by weight. Moreover, the use of such acids is especially preferred when the first stage contains essentially all acetate monomers, e.g., vinyl acetate, or where the second stage polymer, e.g., styrene-butadiene, is at least about 60 percent by weight of the total weight of the composite particles. When the first stage contains high amounts of acrylates, i.e., in excess of 30 percent by weight, and the carboxylated styrene-butadiene copolymer is less than 60 percent by weight based upon the total weight of the composite particles, the use of itaconic acid is not as critical for producing high solids.

One or more hydroxyalkyl(meth)acrylates wherein the alkyl groups contain from 1 to 10 carbon atom can be utilized optionally in combination with the unsaturated carboxylic acid. Examples of such specific compounds include hydroxyethylacrylate, hydroxyethylmethacrylate, hydroxymethylacrylate, hydroxymethylmethacrylate, hydroxypropylmethacrylate, and the like. The amount of such hydroxyalkyl(meth)acrylates when utilized is generally from about 0.25 or 0.5 to about 5.0 or 10.0 and preferably from about 1.0 or 1.5 to about 3.0 or 4.0 parts by weight based upon 100 parts by weight of the total conjugated diene and/or vinyl substituted aromatic monomers in the second stage.

Optionally, various acrylamide or nitrile monomers and derivatives thereof can be utilized in the second stage in amounts up to about 10 parts by weight and preferably from about 0.1 to about 5 parts by weight per 100 parts by weight of said vinyl substituted aromatic and/or conjugated diene monomers. Examples of specific acrylamide monomers and derivatives thereof include alkyl acrylamide, N,N-dialkyl acrylamide, and N,N-dicycloalkyl acrylamide wherein the alkyl group, independently, has from 1 to 14 carbon atoms such as methyl, ethyl, and isopropyl. Examples of specific acrylamides include N,N-dimethyl acrylamide and methacrylamide, with acrylamide being preferred. Examples of specific nitrile monomers include acrylonitrile and methacrylonitrile.

The amount of the (co)polymer derived from the second stage monomers, e.g., vinyl substituted aromatic and/or conjugated diene monomers and carboxylic acid, based upon the total weight of the composite particles is generally from about 20 or 25 to about 70 or 90 percent by weight and preferably from about 65 to about 85 percent by weight.

The various second stage monomers such as the vinyl substituted aromatic monomers, the conjugated diene monomers, the unsaturated carboxylic monomers, the optional acrylamide monomers and hydroxyalkyl(meth) acrylates, as well as other conventional compounds such as the chain transfer agents, free radical initiators, surfactants, and the like are added to the vinyl ester homo or copolymer emulsion polymerized latex in conventional amounts and polymerized in a conventional manner at conventional temperatures such as from about 5° C. to about 95° C., and desirably from about 40° C. to about 90° C. Inasmuch as compounds or agents such as the chain transfer agent, free radical initiator, etc., and the amounts thereof have been described hereinabove with respect to the initial polymerization step, they are not repeated but hereby fully incorporated by reference. Moreover, no equilibration of the monomers of the second and/or later stage is required.

The amount of surfactant added at the second or subsequent polymerization step is important inasmuch as too little surfactant will result in agglomeration of the latex particles whereas too much surfactant will result in the formation of new particles which will have a composition different from the particles which contain both the first stage and the second stage polymer. However, the amount of surfactant added during the second or later stage polymerizations is generally from about 0.20 or 2.5 to about 5.0 or 10, and desirably from about 0.5 or 2.0 or 5.0 parts by weight based upon 100 parts by weight of the various conjugated diene and vinyl substituted aromatic monomers. Various types of surfactants can be utilized such as nonionic as well as anionic with anionic being preferred since the required amounts thereof are generally only 25 to 50 percent that required for nonionic surfactants. Examples of such surfactants are set forth hereinabove. Especially preferred are the various sulfonates such as sodium dodecylbenzene sulfonate, the various sodium sulfosuccinates such as sodium dimethylamyl sulfosuccinate, e.g., Aerosol MA80 from Cytec, sodium dodecyl diphenyl oxide disulfonate, e.g., Dowfax 2A1 from Dow Chemical, and the like.

After completion of the above two or more stage preparation of the phase separated composite-particle latexes of the present invention, the latexes can be utilized for many end uses. Where such end use does not require stability of the latex as in an air knife coating apparatus, no so called "post" or "finishing operation" is required. Where the end use does require latex stability, the above prepared phase separated composite particle latexes of the present invention, after the last, i.e., second or other subsequent stage polymerization, are subjected to a finishing operation wherein additional small amounts of surfactant are added. Subsequently, the latex is neutralized. The amount of the additional surfactants utilized in such post or finishing polymerization treatment is generally from about 0.25 to about 3.0 or 4.0 percent by weight and preferably from about 0.5 to about 1.5 percent by weight based upon the total weight of all latex particles. The addition of the finishing or post amount of surfactant is substantially after all monomers, e.g., at least 85 percent by weight and more desirably at least 90 percent or at least 95 percent by weight, in the second or any later stage have been polymerized. Time-wise, the addition of the finishing surfactant generally occurs about 1 hour after the addition of the last monomers. Neutralization is achieved by adding suitable amounts of caustics such as sodium hydroxide or ammonium hydroxide to achieve a pH range of from about 4.5 to about 8.0 and preferably from about 5.5 to about 7.0. Such neutralization provides the latex with a shelf life of at least 6 months.

Such post or finishing steps improve the mechanical stability of the composite-particle latex by limiting the formation of undesirable large particles. The average particle size of the composite latex particles after finishing is thus generally from about 800 to about 3,500 Å and desirably from about 1,000 or 1,500 to about 2,500 or 2,800, or 2,900 Å. The percent solids of the phase separated, non-concentric, composite latex of the present invention is generally from about 20 to about 60 percent and desirably from 30 or 45 or even 50 percent to about 55 percent by weight.

The in-situ polymerization results in the formation of a phase separated, non-concentric, composite of the above-noted two or more different types of polymers, i.e., first stage and second or subsequent polymerization. The occluded composite-particles, for example, have a styrene and/or butadiene type (unsaturated acid) copolymer as a phase or domain which is generally separated from one or more similar styrene and/or butadiene type (unsaturated acid) copolymer phases or domains.

Figure 2:
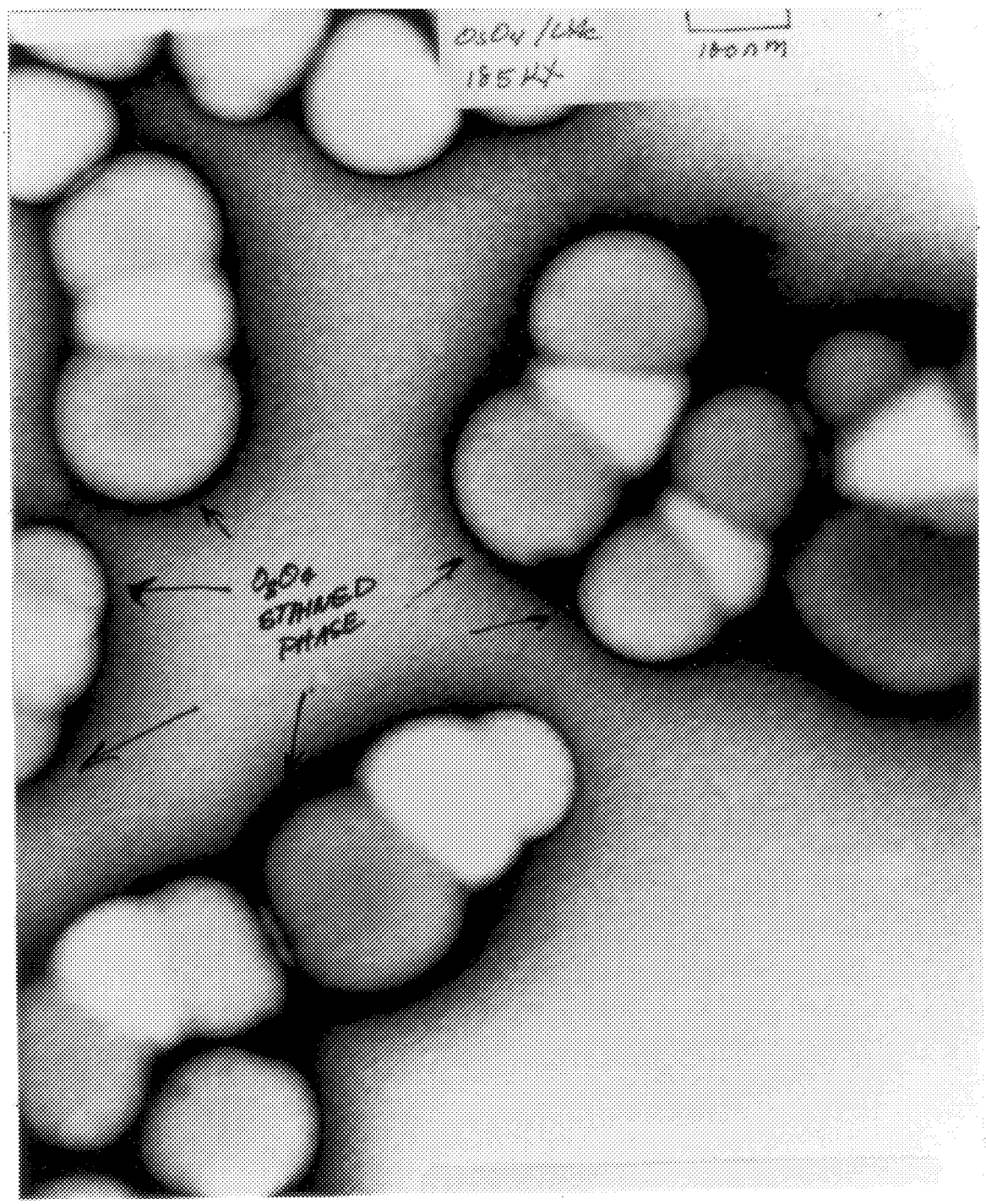

As clearly shown in FIGS. 1 and 2, the occluded composite particles of the present invention contain at least one distinct polymer of each stage located in a domain which is phase separated from the remaining one or more polymers but is attached thereto. As indicated in FIGS. 1 and 2, the dark areas are the osmium-tetraoxide-stained carboxylated styrene-butadiene polymers or domains and the lighter, diffused-appearing regions are the vinyl ester polymers or domains. The composite particles of the present invention thus exhibit a definite occluded morphology containing lobes of carboxylated styrene-butadiene. In FIG. 1, the amount of the vinyl acetate polymers is approximately 75 percent by weight and yet typically multiple carboxylated styrene-butadiene domains exist in greater number than the vinyl acetate domains. Even when the amount of the carboxylated styrene-butadiene domains are increased to approximately 70 percent by weight of the composite particles as in FIG. 2, these domains merely grow and consolidate into larger domains but still are generally in excess of the number of the typically intermediate vinyl ester domains. Moreover, although the amount of the carboxylated styrene-butadiene polymers are sufficient to spherically encapsulate the vinyl ester domain, they do not as is readily seen in FIG. 1. This is true even when the amount of the carboxylated styrene-butadiene polymers are increased to a majority, for example, approximately 70 percent by weight as in FIG. 2.

In summary, the occluded composite-particle latexes of the present invention contain intimately associated phase separated domains which are neither a core-shell nor an inverted core-shell particle, structure, or configuration. In other words, the occluded composite-particle latexes of the present invention are not of a core-shell structure or configuration as defined by U.S. Pat. No. 4,325,856. This patent defines a core-shell structure as particles which have a relatively hydrophobic central portion (e.g., a hydrophobic core portion) and one or more relatively hydrophilic portions preferentially oriented toward the outer surface thereof. Thus, for example, such particles can be conveniently envisioned as being composed of a generally spheroidal, hydrophobic core portion which is either totally or partially surrounded or encapsulated by an encompassing shell of the hydrophilic polymer or which has several discrete regions of such hydrophilic polymer on the surface thereof. Under this definition, our invention is a core-shell free structure.

U.S. Pat. No. 4,325,856 states that a factual determination as to whether a structure is a core-shell is evidenced by (a) the relatively high minimum film-forming temperature exhibited thereby, (b) the presence of acid functionality at the surface of the particles therein as determined by potentiometric titration thereof, (c) the free-film tensile strength and elongation performance thereof, (d) the pH effect under alkaline conditions on the viscosity of such latex (i.e., substantially higher viscosity at pH 8.5 than at pH 4.0) and (e) the electron micrographs of osmium tetraoxide-stained particle cross-sections.

Inasmuch as the occluded composite latex particles of the present invention are not core-shell particles nor reverse encapsulated (inverted) core-shell particles, they are substantially free of shell-core configurations, as well as reverse encapsulated or inverted core-shell configurations. By the term "substantially free of" it is meant that if any such configuration exists, it is in an amount which does not significantly affect the properties of the composite latex. Such amounts are generally less than about 10 percent by weight, desirably less than about 5 percent by weight, and preferably about 3 percent and more preferably even nil, that is, completely free, by weight based upon the total weight of all the particles in the latex. That the composite latexes of the present invention are substantially free of any core-shell particles, etc., is based upon at least the following facts. The viscosity of the composite latex is similar or substantially the same at a pH of approximately 2.5 and at a pH of about 9, that is, generally is less than a 300 percent increase, desirably less than 100 percent increase, and preferably less than a 75 percent or 50 percent increase, as evidenced by the examples. Also, as noted above, electron micrographs of osmium tetraoxide treated latex particles of the present invention, see FIGS. 1 and 2, do not reveal any core-shell particles.

The occluded composite-particle latex of the present invention provides unexpected, if not synergistic, properties such as excellent mottle resistance (i.e., ink absorption uniformity), ink receptivity, porosity, gloss, and wet strength of the coating. Typically, styrene-butadiene latexes in paper coatings have poor mottle, low brightness, low porosity, low blister resistance, low ink receptivity, and they tend to induce yellowness, while latexes containing vinyl ester homo or copolymers are deficient in gloss, ink gloss, dry and wet coating strength. The composite-particle latex demonstrates superior brightness, porosity, ink receptivity, resistance to yellowness and mottle when compared to styrene-butadiene latexes, and better gloss, ink gloss, wet rub strength, and mottle resistance than homopolymer and copolymer of vinyl esters. Furthermore, the composite-particle latex has better porosity, wet strength and mottle resistance than physical blends of styrene-butadiene and vinyl ester latexes which, generally, give a compromise therebetween and thus still exhibit some poor coating performance properties of each latex.

As noted, the occluded composite-particle latexes of the present invention are desirably utilized as binders in coating compositions for application to paper or to paperboard resulting in the formation of composites or laminates. They can also be used as a binder for cellulosic nonwovens, polyester nonwovens or polyolefin nonwovens.

Paper and paperboard coating compositions are known to the art and to the literature and generally include various pigments or fillers such as high brightness clay, calcium carbonate or titanium dioxide, small amounts of sodium hydroxide to control the pH, lubricants such as small amounts of calcium stearate, water, dispersants for the clay such as sodium polyacrylic acid, binders such as starch, protein, polyvinyl alcohol, and the like. From about 4 to about 25 parts by weight and desirably from about 8 to about 15 parts by weight of the latex binder solids, i.e., dry binder polymer, per 100 parts of filler (e.g., clay, calcium carbonate, titanium dioxide, etc.) is generally utilized and the same are mixed along with the above-noted other paper coating additives in any conventional mixer, e.g., a Cowles blade mixer or a ball mill. The paper-coating composition containing a small amount of the latex binder of the present invention is then coated on a paper substrate as by using an air knife coater, a blade coater, or a roll coater. The substrate is then dried in a conventional hot-air oven and/or infrared drying oven. The paper is then generally super-calendered at elevated temperatures as from about 55° C. to about 85° C., with from about 60° C. to about 70° C. being desired, and at high pressure, as from about 800 to 1,500 pounds per linear inch, desirably from about 1,100 to about 1,300 pounds per linear inch, to yield a smooth sheet with high gloss.

The invention will be better understood by reference to the following examples which serve to illustrate but not limit the invention.

EXAMPLES

A. Synthesis of Composite Latex All polymerizations in Examples 1 through 7 were conducted in one quart crown capped bottles in a rotating constant temperature bath at a reaction temperature of 65° C. The components were added in the order described in the examples and are listed on a parts per hundred monomer basis (pphm). The amount of coagulum formed was determined by filtering the latexes through a fine mesh paint filter and drying the material retained in the filter in an oven at about 120° C.

EXAMPLE 1

A first stage polymerization of vinyl acetate with 2-ethylhexyl acrylate produced latexes with high conversion and good stability. This polymer is referred to as the first stage latex.

| Reaction Time: 6 hours at 65° C. | | | |
|---|---|---|---|
| Latex: Components* | 1-A | 1-B | 1-C |
| Vinyl Acetate | 70.0 | 70.0 | 70.0 |
| 2-EHA[(1)] | 30.0 | 30.0 | 30.0 |
| Dextrol OC50[(2)] | 2.5 | 1.3 | 0.6 |
| $K_2S_2O_8$ | 1.0 | 1.0 | 1.0 |
| Coagulum (%) | Trace | 0.1 | 0.5 |
| Solids (%) | 15.9 | 16.0 | 15.7 |
| Conversion (%) | 98.3 | 98.9 | 99.4 |

[(1)]2-Ethylhexyl acrylate
[(2)]Surfactant—a partially sodium neutralized complex organic phosphate ester - Dexter Chemical Corp.
*The amount of deionized water used in this and subsequent recipes, has been omitted for the sake of simplicity.

EXAMPLE 2

Utilizing the copolymers prepared in Example 1, stable composite acetate-carboxylated styrene-butadiene latexes, with low coagulum, were produced at various surfactant levels using a two-stage reaction scheme.

| Reaction Time: 22 hours at 65° C. | | | | |
|---|---|---|---|---|
| Latex: Components | 2-A | 2-B | 2-C | 2-D |
| Latex 1-A | 48.4 | 48.4 | 48.4 | 48.4 |
| Dextrol OC50 | 4.9 | 3.8 | 2.5 | 1.5 |
| Styrene | 56.5 | 56.5 | 56.5 | 56.5 |
| Acrylic Acid | 3.1 | 3.1 | 3.1 | 3.1 |
| Sulfole 120 | 0.2 | 0.2 | 0.0 | 0.2 |
| $K_2S_2O_8$ | 0.7 | 0.7 | 0.7 | 0.7 |
| Butadiene | 40.4 | 40.4 | 40.4 | 40.4 |
| Coagulum (%) | 0.0 | 0.7 | 2.5 | 2.6 |
| Solids (%) | 33.7 | 34.1 | 33.8 | 33.9 |
| Conversion (%) | 99 | 100 | 100 | 100 |

A latex polymer prepared with the recipe identical to that for Latex 2-A using semi-continuous emulsion polymerization was analyzed by differential scanning calorimetry (DSC). Three distinct glass transitions (Tg's) at −32.5° C., 5.4° C., and 30° C. were observed. These correspond, respectively, to a copolymer of vinyl acetate-2-EHA, a styrene-butadiene-acrylic acid terpolymer, and a vinyl acetate homopolymer.

Electron microscopy analysis showed that no separate particles indicative of only the first stage latex particles were present in the final composite latex.

EXAMPLE 3

This example illustrates that the amount of vinyl acetate and 2-EHA can be varied over a broad range to prepare stable first stage latexes.

| Components: Latex | VAc | 2-EHA | $K_2S_2O_8$ | Dextrol OC50 | TSC % | Coagulum % | Conversion % |
|---|---|---|---|---|---|---|---|
| 3-A | 70.0 | 30.0 | 1.0 | 2.5 | 16.2 | 0.0 | 100 |
| 3-B | 80.0 | 20.0 | 1.0 | 2.5 | 16.2 | 0.0 | 100 |
| 3-C | 90.0 | 10.0 | 1.0 | 2.5 | 16.2 | 0.0 | 100 |
| 3-D | 95.0 | 5.0 | 1.0 | 2.5 | 16.2 | 0.0 | 100 |
| 3-E | 100.0 | 0.0 | 1.0 | 2.5 | 16.3 | 0.0 | 100 |

EXAMPLE 4

Other acrylates or methacrylate can be used to prepare the first stage copolymers at high conversion and at low coagulum levels. In this example, methyl methacrylate (MMA) is used in place of 2-EHA.

| Components: Latex | VAc | MMA | $K_2S_2O_8$ | Dextrol OC50 | TSC % | Coagulum % | Conversion % |
|---|---|---|---|---|---|---|---|
| 4-A | 70.0 | 30.0 | 1.0 | 2.5 | 31.9 | 1.1 | 100 |
| 4-B | 90.0 | 10.0 | 1.0 | 2.5 | 30.3 | 0.3 | 100 |
| 4-C | 70.0 | 30.0 | 1.0 | 2.5 | 16.2 | 0.0 | 100 |
| 4-D | 90.0 | 10.0 | 1.0 | 2.5 | 16.2 | 0.0 | 100 |

EXAMPLE 5

Some of the first stage acetate (co)polymers prepared in Examples 3 and 4 were used to prepare vinyl acetate/carboxylated styrene-butadiene composite latexes at varying levels of vinyl acetate content. The alkali stability (thickening tendency) of the latexes was determined using a Brookfield Viscometer (Spindle 2, 20 RPM) at the initial pH of about 2.5 and a base neutralized pH of 9.0. All the latexes behaved similarly and the viscosity increase was small, i.e., 0 to 20 percent.

| | pphm |
|---|---|
| Stage 1 | 45.7 |
| Dextrol OC50 | 5 |
| Sulfole 120 | 0.2 |
| Styrene | 56.5 |
| Acrylic Acid | 3.1 |
| $K_2S_2O_8$ | 0.7 |
| Butadiene | 40.4 |

| Latex | Stage 1 | TSC | Coagulum % | Conversion % | Viscosity pH = 2.3–2.6 (CPS) | Viscosity pH = 9 (CPS) |
|---|---|---|---|---|---|---|
| 5-A | 3-A | 35.0 | 0.0 | 100 | 15.0 | 15.0 |
| 5-B | 3-B | 35.2 | 0.1 | 100 | 15.0 | 15.0 |
| 5-C | 3-C | 34.9 | 0.6 | 100 | 12.5 | 12.5 |
| 5-D | 3-D | 35.0 | 0.6 | 100 | 12.5 | 15.0 |
| 5-E | 3-E | 35.0 | 0.5 | 100 | 12.5 | 15.0 |
| 5-F | 3-C | 34.9 | 0.7 | 100 | 12.5 | 15.0 |
| 5-H | 4-D | 34.9 | 0.4 | 100 | 12.5 | 15.0 |

EXAMPLE 6

(Control) Cross-Linked Poly(Vinyl Acetate-Acrylate).

A first stage polymerization of vinyl acetate, 2-ethylhexyl acrylate and vinyl acrylate ("active crosslinking monomer") produced latexes with high conversion and good stability. This polymer type is suggested by Lindemann et al. as a first stage to an interpenetrating polymer network (IPN).

| Reaction Time: 6 hours at 65° C. | | | | | |
|---|---|---|---|---|---|
| Latex: Components | 6-A | 6-B | 6-C | 6-D | 6-E |
| Vinyl Acetate | 70.0 | 68.0 | 66.0 | 62.0 | 54.0 |
| Vinyl Acrylate | 0.0 | 2.0 | 4.0 | 8.0 | 16.0 |
| 2-EHA | 30.0 | 30.0 | 30.0 | 30.0 | 30.0 |
| Dextrol OC50 | 2.5 | 2.5 | 2.5 | 2.5 | 2.5 |
| $K_2S_2O_8$ | 1.0 | 1.0 | 1.0 | 1.0 | 1.0 |
| Coagulum % | Trace | Trace | Trace | 0.5 | 2.1 |
| Solids (%) | 15.9 | 16.0 | 16.0 | 15.6 | 14.7 |
| Conversion (%) | 98.3 | 98.8 | 98.7 | 99.2 | 100.0 |

EXAMPLE 7

(Control) Cross-Linked Poly(Vinyl Acetate-Acrylate) with Styrene-Butadiene Copolymer.

Styrene, butadiene, and acrylic acid were polymerized in the presence of latexes of Example 6. All the latexes (7-B through 7-E) which utilized first stage latexes, containing a crosslinking moiety, were unstable, i.e., gave 100% coagulum under the conditions used in the polymerization and thus could not be tested for physical properties. Only Latex 7-A, without crosslinker in the first stage, was stable.

| Latex: Components | 7-A | 7-B | 7-C | 7-D | 7-E |
|---|---|---|---|---|---|
| Reaction Time: 22 hours at 65° C. | | | | | |
| Latex 7-A | 49.3 | | | | |
| Latex 7-B | | 48.6 | | | |
| Latex 7-C | | | 48.6 | | |
| Latex 7-D | | | | 47.4 | |
| Latex 7-E | | | | | 44.7 |
| Dowfax 2A1 | 1.0 | 1.0 | 1.0 | 1.0 | 1.0 |
| Dextrol OC50 | 0.5 | 0.5 | 0.5 | 0.5 | 0.5 |
| Styrene | 56.5 | 56.5 | 56.5 | 56.5 | 56.5 |
| Acrylic Acid | 3.1 | 3.1 | 3.1 | 3.1 | 3.1 |
| Sulfole 120 | 0.2 | 0.2 | 0.2 | 0.2 | 0.2 |
| $K_2S_2O_8$ | 0.7 | 0.7 | 0.7 | 0.7 | 0.7 |
| Butadiene | 40.4 | 40.4 | 40.4 | 40.4 | 40.4 |
| Coagulum % | 6.8 | 100.0 | 100.0 | 100.0 | 100.0 |
| Solids (%) | 31.2 | | | | |
| Conversion (%) | 100.0 | | | | |

The presence of a crosslinking monomer in the first stage latex, therefore, leads to the formation of a high level of coagulum in the composite latex of the present invention, which is totally unsuitable for use.

Additional Latex Synthesis

When vinyl acetate was polymerized in the presence of a first stage latex containing a styrene-acrylic acid, styrene-butadiene-acrylic acid or styrene-butadiene-vinyl acrylate-acrylic acid copolymer, the conversion of vinyl acetate was very low (<20%) in all cases. Composite latexes containing SB and PVAc, therefore could not be prepared by polymerizing vinyl acetate as the second stage monomer.

B. Application Properties

Latex 2-A (Example 2) was evaluated in paper and paperboard coatings and its performance was compared to those of the following commercial latexes and latex blends. The blends were selected to approximate the acetate/SB ratio of composite Latex 2-A.

| Latex | Production Description | Polymer Composition |
|---|---|---|
| J | GF 5086[1] | Carboxylated Styrene-Butadiene |
| K | National 1119[2] | Poly(VAc-Ethyl Acrylate) |
| L | Vinac 884[3] | Poly(Vinyl Acetate) |
| M | Blend | A 90/40 (by weight) blend of GF 5086 and Vinac 884 |
| N | Blend | A 90/40 (by weight) blend of GF 5086 and Latex 1-A |

[1] A product of GenCorp Specialty Polymers. The composition of this material is similar to that of second stage polymer of Latex 2-A.
[2] A product of National Starch and Chemical Corp. containing a copolymer of 93/7 vinyl acetate/ethyl acrylate (by weight).
[3] A product of Air Products & Chemicals, Inc., a vinyl acetate homopolymer.

The coated papers were evaluated for optical, strength, and printing properties using standard methods of measurement by the Technical Association of the Pulp and Paper Industry (TAPPI) and to those knowledgeable in the paper and paperboard coatings.

For example:
(a) Ink receptivity was measured by the percent brightness drop for Croda and K&N ink. The percent drop represents the reduction in brightness (or gloss) after removal of the ink (or varnish). The smaller the number, the less porous the coating is and, therefore, the less penetration of the ink (or varnish) into the substrate (i.e. low ink or varnish receptivity). Generally, greater Croda and K&N ink receptivities, together with high porosity and smoothness, improve printability, but they produce low gloss and ink gloss. In contrast, high varnish gloss is desirable, especially for paperboard.

(b) The yellowness index represents the tendency of a sheet of paper or paperboard to look less white and more yellow, something which is not desirable from an aesthetic point of view. Therefore, lower yellowness indices are desirable.

1. Evaluation in Paper Coatings

The paper coating formulations were prepared using the following recipe. The coatings were applied onto a 27 lbs/3300 ft² base sheet with a #10 rod and dried at 150° F. for 0.5 minutes. The coat weight was 10±0.5 lbs/3300 ft². The coated sheets were super calendered at four nips, 150° F. under 1000 psi, in a laboratory sheet-fed hot calender.

| Function | Material | % Solids | Parts |
|---|---|---|---|
| Dispersing Agent | Sodium Polyacrylate | 40.0 | 0.15 |
| Pigment | No. 1 High Brightness Clay | 99.5 | 85.00 |
| Pigment | Fine Ground Calcium Carbonate | 75.9 | 15.00 |
| Binder Latex | Variable | Variable | 13.00 |
| Co-Binder | Oxidized Starch | 25.5 | 3.00 |
| Insolubilizer | MF Resin | 45.0 | 0.25 |
| Lubricant | Calcium Stearate | 49.4 | 0.10 |

The paper coating properties obtained with composite Latex 2-A as compared to other latexes and latex blends gave differentiable and superior paper properties.

(a) Latex 2A gave superior ink gloss, delta gloss, K&N ink receptivity, porosity, and smoothness. When compared to the blend of the poly(vinyl acetate-acrylate) copolymer and carboxylated SB latex (polymer N), coatings made with Latex 2-A demonstrated advantages in gloss, ink gloss, delta gloss, roughness, wet rub and wet pick.

(b) In the same paper coating formulation, composite Latex 2-A was superior in brightness, opacity, ink gloss, delta gloss, Croda ink receptivity, PPS roughness (i.e., smoothness), and porosity over a carboxylated styrene-butadiene binder (Latex J).

(c) The composite latex (Latex 3-A) had superior paper gloss, ink gloss, PPS roughness (i.e., smoothness), and wet rub in comparison to vinyl acetate polymeric binders (Latexes K and L) when compared in the same paper coating formulation.

2. Evaluation in Paperboard Coatings

The paperboard coating formulations were prepared using the following recipe. The coatings were applied to a solid bleached sulfate (SBS) paperboard substrate with a wire rod and dried at 150° F. for 0.5 minutes. The coat weight was 5 lbs/1000 ft². The paperboard was calendered with 1 nip at 200° F. and 500 psi.

| Function | Material | % Solids | Parts |
|---|---|---|---|
| Dispersing Agent | Sodium Polyacrylate | 40.0 | 0.05 |
| Clay | High Brightness No. 1 Clay | 99.5 | 85.00 |
| Pigment | Fine Ground Calcium Carbonate | 75.9 | 15.00 |
| Binder Latex | Variable | Variable | 18.00 |
| Thickener | Alkali Swellable Acrylate | — | 0.10 |
| | Final pH 8.0–8.5 | | |

The paper board coating properties obtained with composite Latex 2-A as compared to other latexes and latex blends gave differentiable and superior paper properties.

(a) The composite latex binder (Latex 2-A) displayed superior performance compared to the blends (latexes M and N) in brightness, porosity, Mylar™ adhesion and mottle. In addition, the composite latex binder was superior in yellowness and brightness to Latex M and, at least, comparable to Latex N.

(b) Latex 2-A has superior brightness, K&N ink receptivity, brightness stability, porosity, Mylar™ adhesion, and mottle resistance in comparison to the carboxylated styrene-butadiene latex binder (Latex J).

(c) Composite Latex 2-A exhibits superior varnish gloss, porosity, and mottle resistance in comparison to the poly (vinyl acetate) binders (Examples K and L).

EXAMPLE 8

SB COMPOSITE USING A COMMERCIAL ACETATE STAGE 1:

The latex described below was prepared in a 20-gallon stainless steel reactor by utilizing a commercial acetate as Stage 1. The overall composition is given below:

[parts per 100 parts monomers=PPHM]

| | |
|---|---|
| PVAc Stage 1 | 30.0 (PVAc = Polyvinyl Acetate = Polyco 21494D) |
| Styrene | 40.30 |
| 1,3-Butadiene | 27.10 |
| Acrylic Acid | 2.10 |
| Itaconic Acid | 0.50 |

A. ACETATE STAGE 1:

A commercial acetate latex was used with modification as Stage 1. this latex may be characterized as a low acrylate copolymer of vinyl acetate with a glass temperature of 30° C. and a particle size of 1550 Å. By analysis, this latex copolymer contains about 6 weight % of C-2 to C-4 acrylate esters (ethyl and/or butyl acrylate). No free carboxylic acid groups were detected by Carbon-13 NMR even after 189,000 transients (scans). Also, no residual itaconic or (meth) acrylic acids were detected in the serum.

Moreover, this latex is greater than 97% soluble in THF at room temperature, indicating that the acetate polymer is essentially free of crosslinks. This commercial acetate was provided as a 47.5% solids latex with a specific gravity of 1.08 at a pH of 7.0.

B. STAGE 2-CARBOXYLATED SB PORTION

Polymerizations were carried out in a 20-gallon stainless steel reactor equipped with an A200 agitator operated at 140 rpm. To the reactor was added the following:

| | |
|---|---|
| Deionized water | 47.48 PPHM |
| Itaconic Acid | 0.50 |
| Dowfax 2A1 | 0.368 |
| Hampene Na3 | 0.05 |
| Sodium Persulfate | 0.655 |
| PVAc (Polyco 214-94D) | 30.00 (Active basis, PVAc = 45.8% of PC 2149AD) |

The reactor was evacuated under low pressure and filled with nitrogen twice. The reactor was heated to 170° F. A total of 40.3 PHM styrene, 0.48 Sulfole-120 (tertiary dodecyl mercaptan), 2.1 acrylic acid, and 27.1 butadiene was added over a period of 4.5 hours. These monomers plus Sulfole-120 were divided into six equal increments and pressurized into the reactor under nitrogen at 45 minute intervals. Thirty minutes after the fifth increment, a surfactant solution of 0.30 Dowfax 2A1 in 5 PPHM of deionized water was added. Forty-five minutes after the last monomer increment, 0.50 PPHM Dowfax 2A1+4.0 parts deionized water was added. Thirty minutes after this surfactant addition, 0.45 PPHM of sodium hydroxide was added as a 13% solution. Thirty minutes later, 0.15 sodium persulfate and 0.25 Drew L198 defoamer in 3.33 PPHM deionized water were added. The reactor was maintained at 170° F. for an additional 1.5 hours and cooled to room temperature. Batches were steam stripped to remove volatile organic compounds.

Four replicate batches were made using this recipe with the following latex properties: total solids=48.9±0.3%; pH=5.3±0.1; coagulum=0.004±0.004; residue on 325 mesh= 87±20 ppm (parts per million); and Nicomp particle size= 2165±50 Å. The above recipe minimizes raw material costs. It is necessary to use 0.5 parts of Dowfax 2A1 or other anionic surfactants with outstanding ability (Dextrol OC-50, sodium dodecylbenzene sulfonate, or sodium lauryl sulfate) before the neutralization step (13% sodium hydroxide). Without this surfactant addition, the latex particles agglomerate to sizes (3000 Å or higher) which are unfavorable in the coating process. A blend in the four replicate batches was made and found to have application properties equal to Example 2-A.

Note: If the Dowfax (mentioned in bold) or other stabilizing surfactant is added at the start of stage 2, this initiates new particles which are all SB without acetate. It is possible to add the stabilizing surfactant in small enough amounts over the course of the polymerization to prevent "reseeding" but the above procedure is the easiest and most reliable. In short, a surfactant has two roles in latex production: (1) form micelles which form latex seed particles and (2) stabilize the growing or finished latex particle. In the present example, primarily function (2) is utilized since stage 1 is our seed.

EXAMPLE 9

SB COMPOSITE USING A COMMERCIAL ACETATE STAGE 1: NO ACRYLIC ACID & 65 PARTS STAGE 1

HEA VERSION

[HEA=2-hydroxyethylacrylate]

The latex described below was prepared in a 1-gallon stainless steel rector by utilizing a commercial acetate as Stage 1. The overall composition is given below: [parts per 100 parts monomers=pphm]

| | |
|---|---|
| PVAc Stage 1 | 65.00 (PVAc = Polyvinyl Acetate = Polyco 21494D) |
| Styrene | 19.90 |
| 1,3-Butadiene | 13.10 |
| 2-Hydroxyethyl-acrylate | 1.50 |
| Itaconic Acid | 0.50 |

A commercial acetate latex was used without modification as Stage 1.

The polymerization was carried out in a 1-gallon stainless steel reactor as described in Example 8. To the reactor was added the following:

| | |
|---|---|
| Deionized water | 18.00 pphm |
| Itaconic Acid | 0.50 |
| Hampene Na3 | 0.05 |
| Sodium Persulfate | 0.53 |

| | |
|---|---|
| PVAc (Polyco 2149AD) | 65.00 (Active basis, PVAc = 45.8% of PC 2149AD) |

The reactor was evacuated under low pressure and filled with nitrogen twice. The reactor was heated to 170° F. A total of 19.9 PPHM styrene, 0.48 Sulfole-120 (tertiary dodecyl mercaptan), 1.50 HEA (2-Hydroxyethylacrylate), and 13.1 butadiene was added in four equal increments. Increment #1, 2, & 3 were added 40 minutes apart. A 6% solution of 0.30 parts Dextrol OC-50 was added 30 min. after increment #3. Twenty-five minutes later the fourth and final increment was added. One hour after the last monomer addition, 0.50 PPHM of a 15% Dowfax 2A1 stabilizer solution was added. Thirty minutes later 0.25 PPHM of sodium hydroxide was added as a 4.2% solution. After an additional thirty minutes, 0.15 sodium persulfate and 0.25 Drew L198 defoamer in 3.33 PHM deionized water were added. The reactor was maintained at 170° F. for an additional 2.0 hours and cooled to room temperature. The latex properties out of the reactor were as follows: total solids=48.5%, pH=5.9, coagulum= 0.16%, Nicomp particle size=1910A, Baker cell gel in THF=40%. The latex was stripped to remove volatile organic compounds by heating on a rotary evaporator under slight vacuum.

EXAMPLE 10

SB COMPOSITE USING A COMMERCIAL ACETATE STAGE 1:

[75 PARTS STAGE 1]

The latex described below was prepared in a 1-gallon stainless steel reactor described in Example 8 by utilizing a commercial acetate as Stage 1. The overall composition is given below:

| [parts per 100 parts monomers = pphm] | |
|---|---|
| PVAc Stage 1 | 75.00 (PVAc = Polyvinyl Acetate = Polyco 2149 AD) |
| Styrene | 12.93 |
| 1,3-Butadiene | 10.07 |
| Acrylic Acid | 1.50 |
| Itaconic Acid | 0.50 |
| Deionized water | 18.83 pphm |
| Itaconic Acid | 0.50 |
| Hampene Na3 | 0.05 |
| Sodium Persulfate | 0.53 |
| PVAc (Polyco 2149AD) | 75.00 (Active basis, PVAc = 45.8% of PC2149AD) |

The reactor was evacuated under low pressure and filled with nitrogen twice. The rector was heated to 170° F. A total of 12.93 pphm styrene, 0.12 Sulfole-120 (tertiary dodecyl mercaptan), 1.50 acrylic acid, and 10.07 butadiene was added in three equal increments. Increment #2 was added 45 minutes after increment #1. A 7.4% solution of 0.30 parts Dowfax 2A1 was added 30 minutes after increment #2. Twenty-five minutes later the third and final increment was added. One hour after the last monomer addition, 0.50 pphm of a 15% Dowfax 2A1 stabilizer solution was added. Thirty minutes later 0.35 pphm of sodium hydroxide was added as a 5.9% solution. After an additional thirty minutes, 0.15 sodium persulfate and 0.25 Drew L198 defoamer in 3.33 pphm deionized water were added. The reactor was maintained at 170° F. for an additional 2.0 hours and cooled to room temperature. The latex properties out of the reactor were as follows: total solids=45.9%, pH=5.2, coagulum= 0.08%, Nicomp particle size=1970 Å. The latex was stripped to remove volatile organic compounds by heating on a rotary evaporator under slight vacuum.

EXAMPLE 11

SB COMPOSITE USING A MIXED VINYL ESTER STAGE 1:

This section covers a latex which was made with a "soft" non-vinyl-acetate Stage 1. Vinyl propionate and vinyl 2-ethylhexanoate are in the same class of compounds as vinyl acetate, namely vinyl esters. The advantage of this approach is to produce both a "soft" (relatively low Tg) Stage 1 & Stage 2. This latex was prepared in two stages so as to characterize the various steps. The overall composition is given below:

| [parts per 100 parts monomers = pphm] | |
|---|---|
| VL3 + V2EH State 1 | 30.00 (80/20 VL3/V2EH copolymer) |
| Styrene | 39.40 |
| 1,3-Butadiene | 27.50 |
| Acrylic Acid | 2.10 |
| Itaconic Acid | 1.00 |

A. Mixed Vinyl Ester Stage 1: Polymerizations were conducted in a stainless-steel 1-gallon reactor. To the reactor is added the following amounts in pphm [parts per hundred parts monomer] based on 100% active materials:

| | |
|---|---|
| Deionized water | 204.6 pphm |
| Sodium Bicarbonate | 0.22 |
| Dextrol OC-50 | 0.75 |
| Sodium Lauryl Sulfate* | 1.71 |
| Hampene Na3** | 0.03 |
| Solution A | 40.00 |

[Solution A = 80/20 wt. ratio of vinyl propionate and vinyl 2-ethylhexanoate, commercial sources are Vynate VL3 ™ & Vynate V2EH ™ respectively from Union Carbide Corp.]
*SLS = Avirol SL-2020 = a product of Henkel Corporation Hampene Na3 = the trisodium salt of ethylenediaminetetraacetic acid (EDTA) = a product of Hampshire Chemical Company.

The vessel is next sparged with nitrogen; the air space evacuated under low vacuum and filled with nitrogen. The reactor is heated to 150° F. and a solution of 0.556 pphm of sodium persulfate in 10.7 pphm deionized water is charged into the reactor under pressurized nitrogen. After a 30-minute reaction time, the remaining 60 pphm of Solution A (mixed vinyl esters listed above) is added to the reactor in four equal increments each 20 minutes apart. After the last increment of mixed monomers has been added, the reactor is maintained at 150° F. for two hours to complete the polymerization. The resultant latex had properties as follows: TSC (Total Solids)=30.3%; 97.35%. yield; coagulum= nil; pH=5.8; Baker cell gel in tetrahydrofuran=2.0%.

B. STAGE 2-CARBOXYLATED SB PORTION

To the 1-gallon reactor used for Stage 1 was added the following:

| | |
|---|---|
| Deionized water | 22.92 pphm |
| Dowfax 2A1 | 0.50 |
| Itaconic Acid | 1.00 |
| Sodium Persulfate | 0.655 |

-continued

| | |
|---|---|
| Example 11-A VL3 + V2EH | 30.00 (Active basis, Stage 1 = 30.56% copolymer) |

The reactor was heated to 170° F. The following monomers were added along with 0.72 pphm of Sulfole-120 in six equal increments: styrene 39.4, acrylic acid 2.1, and butadiene 27.5. The first increment was added to the reactor and after 30 minutes another increment (M-2) followed. After 30 minutes 0.40 pphm of Dowfax 2A was added as a 7.75% aqueous solution. After 15 minutes the third increment was added. Increments #3, 4, and 5 were all added 30 minutes apart. Thirty minutes after M-5, another surfactant solution of 0.40 Dowfax 2A1 was added as a 7.75% aqueous solution. After 15 minutes the last increment (M-6) was added. After 30 minutes 0.75 pphm of Dowfax 2A1 was added as a 15% solution. After an additional 30 minutes, 0.45 pphm of sodium hydroxide was added as a 7.9% aqueous solution. Thirty minutes later 0.15 pphm of sodium persulfate, 0.25 Drew L198 defoamer, and 3.33 pphm deionized water were added. The reactor was maintained at 170° F. for another 90 minutes and then cooled to room temperature. The resultant latex had the following properties: TSC=46.5%; coagulum= 0.22%; pH=5.4; Baker cell gel in tetrahydrofuran=71%; Tg=7° C. (single Tg, but is actually the overlap of two incompatible polymer glass temperatures). The latex was heated on a rotary evaporator under low vacuum to remove VOC's (volatile organic compounds).

EXAMPLE 12

A series of latex samples were made according to Example 8 except for using a 30% solids, all-acetate stage 1. Examples 12-B, C, and D added 1.0 pphm Dowfax 2A1 prior to neutralization; whereas Example 12-A did not use any Dowfax before the neutralization.

| | G | | D75 | |
|---|---|---|---|---|
| Example 12 | BEFORE | AFTER | BEFORE | AFTER |
| 12A | 2331 | 3000 | 2592 | 3271 |
| | **No Dowfax | | | |
| 12B | 2289 | 2554 | 2356 | 2767 |
| 12C | 2338 | 2450 | 2346 | 2577 |
| 12D | 2320 | 2540 | 2426 | 2765 |

D75 = the particle size for the upper quartile, 25 wt. % of particles are equal or larger than D75. The values for "before" and "after" relate to before and after neutralization with 5% sodium hydroxide.

The above chart shows that neutralization with 5% sodium hydroxide induces agglomeration (potassium hydroxide and ammonia were also tried with similar effects). An addition of 1.0 pphm of Dowfax 2A1 reduces the amount of particle size shift by 50–70%, thus indicating a reduction in agglomeration.

SUMMARY OF RESULTS

As is apparent from the various property data, the composite-particle latex of the present invention exhibited improved results with regard to numerous properties as opposed to various prior art SER latexes, polyvinyl acetate latexes, polyvinyl acetate-ethylacrylate latexes, and physical blends of an SBR latex and vinyl acetate latexes. As is apparent from the above data, the present invention generally yielded an improved balance of properties in all tested across-the-board properties and therefore confirms that unexpected if not synergistic results were obtained with the composite-particle latexes of the present invention.

While in accordance with the Patent Statutes, the best mode and preferred embodiment has been set forth, the scope of the invention is not limited thereto, but rather by the scope of the attached claims.

What is claimed is:

1. A latex composition, comprising:
   occluded composite particles containing at least a first polymer and at least a second polymer, said occluded particles comprising a morphology of a plurality of lobes of said second polymer, said second polymer being phase separated from said first polymer,
   said first polymer being formed from monomers comprising at least one vinyl ester having from 4 to 12 carbon atoms, optionally ethylene, and optionally one or more alkyl acrylates or alkyl methacrylates wherein the alkyl group has from 1 to 10 carbon atoms, and
   said second polymer being formed in the presence of said first polymer from monomers comprising at least one vinyl substituted aromatic having from 8 to 12 carbon atoms, or at least one conjugated diene having from 4 to 12 carbon atoms, or combinations thereof, and at least one unsaturated carboxylic acid having a total of from 3 to 12 carbon atoms.

2. A latex composition according to claim 1, wherein the amount of said second polymer is from about 20 percent to about 90 percent by weight based upon the total weight of said occluded composite particles.

3. A latex composition according to claim 2, wherein said second polymer is formed from about 0.1 to about 10 parts by weight of said one or more unsaturated carboxylic acid monomers per 100 parts by weight of said at least one conjugated diene or said at least one vinyl substituted aromatic monomer or combinations thereof, and wherein said first polymer has less than about 2 percent by weight of hydrophilic repeat units therein other than said vinyl ester.

4. A latex composition according to claim 3, wherein said first polymer is formed from vinyl acetate, wherein said second polymer is formed from styrene, butadiene, and said at least one unsaturated carboxylic acid monomers which comprise itaconic acid, wherein the amount of said styrene is from about 40 parts to about 75 parts by weight and wherein the amount of said butadiene is from about 25 parts to about 60 parts by weight based upon 100 parts by weight of said styrene and butadiene monomers, wherein the amount of said second polymer in said occluded latex particle is from about 65 to about 85 percent by weight, and wherein the amount of said occluded composite particles is at least 45 percent by weight of the latex composition.

5. A latex composition according to claim 3, wherein said first polymer is formed from vinyl acetate and said one or more alkyl acrylates wherein said alkyl group is ethyl, butyl, or ethylhexyl, wherein the amount of said vinyl acetate monomer is from about 70 parts to about 99 parts by weight and wherein the amount of said one or more alkyl acrylate monomers is from about 1 to about 30 parts by weight based upon 100 parts by weight of said vinyl acetate and said alkyl acrylate monomers, wherein said second polymer is formed from styrene, butadiene, and said at least one unsaturated carboxylic acid monomer, wherein the amount of said styrene is from about 40 parts to about 75 parts by weight and wherein the amount of said butadiene is from about 25 parts to about 60 parts by weight based upon 100 parts by weight of said styrene and butadiene monomers, and
   wherein the amount of said occluded composite particles of the latex composition is at least 45 percent by weight.

6. A process for forming a latex, containing composite particles, comprising;

forming at least a first polymer from at least one vinyl ester monomer having a total of from 4 to 12 carbon atoms, optionally ethylene, and optionally one or more alkyl acrylate or alkyl methacrylate monomers wherein the alkyl portion has from 1 to 10 carbon atoms, said first polymer having less than about 2.0 percent by weight of hydrophilic repeat groups other than those derived from said at least one vinyl ester monomer, and subsequently forming at least a second polymer in the presence of said first polymer to form occluded composite particles, said second polymer derived from monomers of at least one vinyl substituted aromatic having from 8 to 12 carbon atoms, or at least one conjugated diene having from 4 to 12 carbon atoms, or combinations thereof, and at least one unsaturated carboxylic acid having a total of from 3 to 12 carbon atoms, said occluded composite particles comprising a morphology of a plurality of lobes of said second polymer being phase separated from said first polymer.

7. A process according to claim 6, including forming an additional polymer or copolymer in the presence of said first and second polymers.

8. A process for forming a latex according to claim 6, wherein said first polymer is formed from vinyl acetate, wherein said second polymer is formed from styrene, butadiene, and said at least one unsaturated carboxylic acid comprising itaconic acid, wherein the amount of said styrene is from about 40 parts to about 75 parts by weight and wherein the amount of sad butadiene is from about 25 parts to about 60 parts by weight based upon 100 parts by weight of said styrene and butadiene monomers, and wherein the amount of said itaconic acid is from about 0.1 to about 10 parts by weight based upon 100 parts by weight of said butadiene and said styrene monomers, wherein the amount of the occluded composite particles is at least 45 percent by weight of the latex composition, and optionally adding a surfactant to the latex after substantial polymerization of said second polymer.

9. A process for forming a latex according to claim 6, wherein said first polymer is formed from vinyl acetate and said one or more alkyl acrylates wherein said alkyl group is ethyl, butyl, or ethylhexyl, wherein the amount of said vinyl acetate monomer is from about 70 parts to about 99 parts by weight and wherein the amount of said one or more alkyl acrylate monomers is from about 1 to about 30 parts by weight based upon 100 parts by weight of said vinyl acetate and said alkyl acrylate monomers, wherein said second polymer is formed from styrene, butadiene, and said at least one unsaturated carboxylic acid, wherein the amount of said styrene is from about 40 parts to about 75 parts by weight and wherein the amount of said butadiene is from about 25 parts to about 60 parts by weight based upon 100 parts by weight of said styrene and butadiene monomers, and wherein the amount of said at least one carboxylic acid is from 0.1 to about 10 parts by weight based upon 100 parts by weight of said butadiene and said styrene monomers, wherein the amount of said occluded composite particles of the latex composition is at least 45 percent by weight, and optionally adding a surfactant to the latex after substantial polymerization of said second polymer.

10. A latex composition, comprising;

the reaction product of at least one vinyl substituted aromatic monomer having from 8 to 12 carbon atoms, or at least one conjugated diene monomer having from 4 to 12 carbon atoms, or combinations thereof, and optionally at least one unsaturated carboxylic acid monomer having a total of from 3 to 12 carbon atoms, reacted in the presence of a first polymer to form a second polymer, said first polymer formed from monomers comprising at least one vinyl ester having a total of from 4 to 12 carbon atoms, optionally ethylene, or optionally one or more alkyl acrylates or alkyl methacrylates wherein said alkyl portion has from 1 to 10 carbon atoms, the reaction product comprising a particle morphology of a plurality of lobes of said second polymer, said second polymer being phase separated from said first polymer.

11. A latex composition according to claim 10, wherein said reacted monomers comprise styrene, butadiene, and itaconic acid, and wherein said first polymer is formed from vinyl acetate, and optionally wherein said reacted monomers after substantial polymerization thereof are post polymerized in the presence of added surfactant.

12. An article of manufacture, comprising;

a cellulosic substrate coated with a composition containing the occluded composite particles of claim 1.

13. An article of manufacture according to claim 12, wherein said substrate is paper or paperboard, wherein said vinyl ester monomer is vinyl acetate, wherein said conjugated diene monomer is butadiene, wherein said aromatic monomer is styrene, and wherein the amount of said second polymer is from about 30 to about 90 percent by weight based upon the total weight of said composite particles.

* * * * *